H. P. KRAFT.
TIRE DEFLATING MACHINE.
APPLICATION FILED AUG. 23, 1920.

1,408,099.

Patented Feb. 28, 1922.

INVENTOR:
Henry P. Kraft
By Attorneys,
Fraser Funk & Myers

UNITED STATES PATENT OFFICE.

HENRY P. KRAFT, OF RIDGEWOOD, NEW JERSEY.

TIRE-DEFLATING MACHINE.

1,408,099.  Specification of Letters Patent.  Patented Feb. 28, 1922.

Application filed August 28, 1920. Serial No. 405,413.

*To all whom it may concern:*

Be it known that I, HENRY P. KRAFT, a citizen of the United States of America, residing in Ridgewood, in the county of Bergen and State of New Jersey, have invented certain new and useful Improvements in Tire-Deflating Machines, of which the following is a specification.

This invention relates to tire deflating machines of the type set forth in a prior patent granted to me, No. 1,297,186, and a prior application filed by me October 14, 1918, being particularly directed to the expansible support for the tire tube during deflation, one form of which is shown in such prior application.

The principal object of the present invention is to provide an expanding support or holder for the tire, which will be simple in construction and which will operate effectively through gravity, although capable of manual expansion if desired. To this end I provide a construction in which the support has a lower member having a broad face, which member is adapted preferably to move downwardly by gravity, substantially the entire weight of the device being utilized for this purpose. Means are also provided for moving it positively in a downward direction, and for lifting it to restore it to its initial position. Preferably an upper member is also provided, of the same general form as the lower member, the two being best made as an elongated collapsible form. The invention also includes certain other features of improvement which will hereinafter be more fully described.

Referring to the drawings, which show the preferred form of the invention,—

Figure 1:
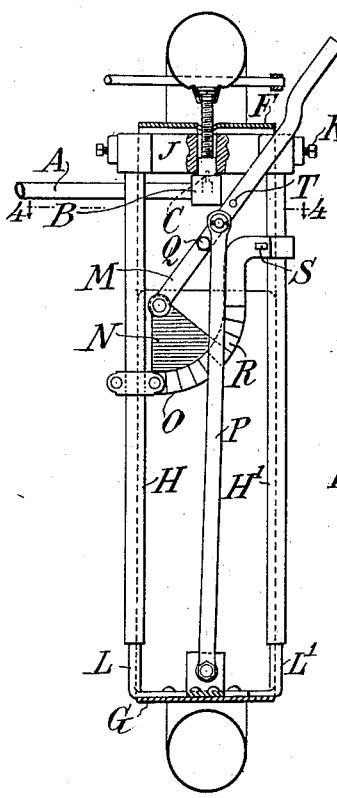
Figure 1 is a side view of the device showing the latter in collapsed form.
Figure 2:
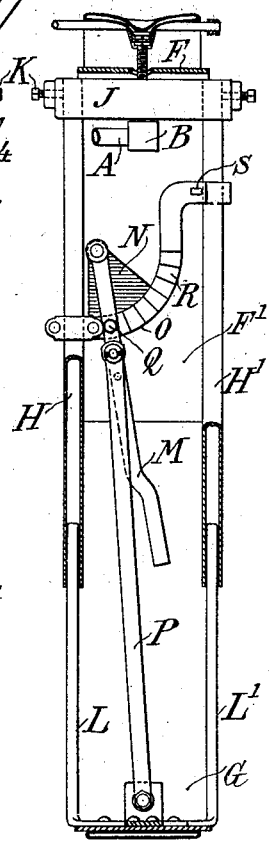
Fig. 2 is a similar view showing it in expanded form.
Figure 3:
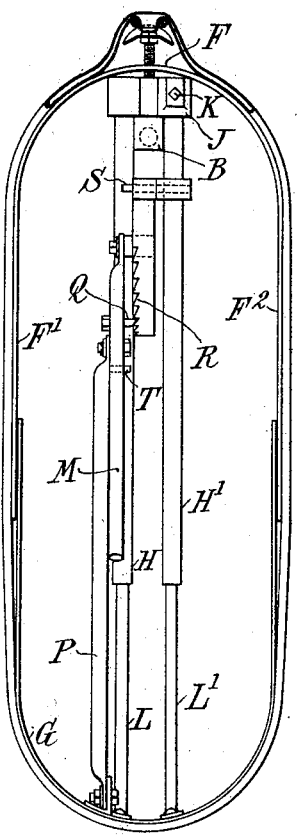
Fig. 3 is a front view.
Figure 4:
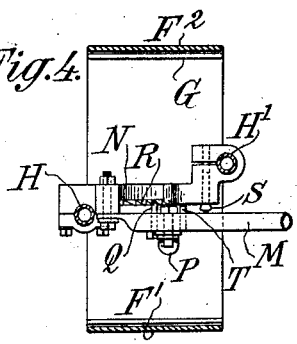
Fig. 4 is a section on the line 4—4 in Fig. 1.

Referring to the drawings, let A indicate a suction pipe which is connected with a suitable vacuum pump, and B a tire valve holder which preferably has a deflating pin C adapted to open the check of the tire valve when the tube is placed in position on the device. The upper portion of the tube, or that portion which carries the tire valve, may rest upon a support similar to that shown in my aforesaid application.

Supported by the tube A, or in any other suitable manner, is a top support F which preferably comprises a flat band of metal of a width equal to or greater than the width of the tire tube when collapsed, and preferably curved at its top side and having straight legs $F'$, $F^2$. The support F has a similar member G arranged reversely and being adapted to slide up and down with reference to the support F. When the device is in its collapsed position shown in Fig. 1, the tire tube easily encircles it. If now the member G is released, it will drop by gravity, thus placing a considerable tension upon the tire tube, so that as the air is exhausted through the suction tube A, the tire tube, instead of being wrinkled or twisted, is collapsed evenly in flat condition suitable for folding and packing.

The member G is preferably guided in its upward and downward movements in some suitable manner. I have found that the construction shown in the drawing is efficient for this purpose. In this construction a pair of tubular guides H H' is provided, these guides being held at their upper ends in a crosspiece J which is provided with recesses to receive the ends of the tubes, the latter being held in place by set nuts K. The member G is in this construction provided with rods L. L' which slide in the tube H H' respectively. This holds the two sections of the collapsible form in proper alignment while permitting a free sliding movement. The entire weight of the member G and its rods is hence practically available to secure the proper tension on the tire tube.

It is desirable to provide means by which the member G can be restored to its upper or collapsed form, and this is conveniently done in the present instance by means of a lever M pivoted to a plate N which is best formed as an integral part of a sector O. The latter may be clamped to the tubes H H' by means of bolts, as shown. The lever M is connected to the member G by a rod P which, when the lever is moved upwardly, elevates the member G to its fully collapsed position. The weight of the lever and connecting rod P also add to the effective weight of the member G.

It is also desirable to provide means whereby the form may be forcibly expanded and held in expanded position. In certain sizes and weights of tubes this feature is convenient, if not important. The forcible expansion may be accomplished by downward pressure upon the lever M, and the device may be held in its expanded position by a pin Q which engages teeth R formed on the sector O. There is sufficient looseness of the parts to make the pin Q act as a pawl, so that a spring pawl is not necessary, although one may be substituted if desired. When the tube is fully deflated, the lever may be pushed slightly to the left to disengage the pin Q from the teeth R, the parts being sufficiently loose to permit this.

It is also desirable that means be provided to hold the member G in its upward or collapsed position during the operation of taking off the deflated tube and adjusting another in place. To this end I provide a pin S which is mounted in fixed position, and a pin T which is adapted to engage the pin S. This engagement may be made by shifting the lever to the right slightly, whereupon the two pins engage. They may be disengaged by a reverse movement.

In operation under normal conditions, the tube is adjusted in place on the form with its valve in the support B, the lever shifted to disengage the pins T and S, permitting the member G to drop and place a tension on the tire which is sufficient to prevent its warping or twisting during the deflating operation. When the tire is completely deflated the lever is elevated to collapse the form, whereupon the tire may be easily lifted off. If the weight of the system is not sufficient, additional pressure may be placed upon the tube during the process of deflation.

As compared with a circular form, my improved oblong form shows a great advantage in that there is practically no frictional grip exerted by the tube upon the form as the tube collapses. In the circular form this frictional grip is excessive and materially retards the expansion of the form and consequently affords a greater opportunity for the tube to twist.

While I have shown and described one form of the invention, it will be obvious that the invention is not limited to the particular construction shown, but may be varied in many ways while still falling within the scope of the invention.

What I claim is:

1. In a deflating machine for tire tubes or the like, a support for the tire tube, a member arranged within the tire tube, and means for mounting said member so that it may drop bodily by gravity against the inner periphery of the tube.

2. In a deflating machine for tire tubes or the like, a support for the tire tube, a member arranged within the tire tube, means for mounting said member so that it may drop bodily by gravity against the inner periphery of the tube, and means for restoring said member to its initial position.

3. In a deflating machine for tire tubes or the like, a support for the tire tube, a member arranged within the tire tube, means for mounting said member so that it may drop bodily by gravity against the inner periphery of the tube, and means for restoring said member to its initial position, said member comprising a curved plate.

4. In a deflating machine for tire tubes or the like, a support for the tire tube, a member arranged within the tire tube, means for mounting said member so that it may drop bodily by gravity against the inner periphery of the tube, and a top support for the tire tube.

5. In a deflating machine for tire tubes or the like, a support for the tire tube, a lower member adapted to slide upwardly and downwardly, and a lever for restoring said member.

6. In a deflating machine for tire tubes or the like, a support for the tire tube, a lower member adapted to slide upwardly and downwardly, and a lever for forcibly pressing said member downwardly.

7. In a deflating machine for tire tubes or the like, a support for the tire tube, a lower member adapted to slide upwardly and downwardly, a lever for forcibly pressing said member downwardly, and means for holding said member in its depressed position.

8. In a deflating machine for tire tubes or the like, the combination of an upper plate and a lower plate each bent at its middle, the lower plate being adapted to slide with relation to the upper plate, the two forming an expanding device for the tire tube.

9. In a deflating machine for tire tubes or the like, the combination of an upper plate and a lower plate each bent at its middle, the lower plate being adapted to slide with relation to the upper plate, the two forming an expanding device for the tire tube, and guides for guiding the lower plate.

10. In a deflating machine for tire tubes or the like, the combination of an upper plate and a lower plate each bent at its middle, the lower plate being adapted to slide with relation to the upper plate, the two forming an expanding device for the tire tube, guides for guiding the lower plate, and said guides comprising tubes fixed to one member, and rods sliding in said tubes fixed to the other member.

11. In a deflating machine for tire tubes or the like, an expanding form comprising upper and lower members each curved at its middle, guides for the lower member permitting it to slide with reference to the upper member, and a lever for restoring the lower member.

12. In a deflating machine for tire tubes or the like, an expanding form comprising upper and lower members each curved at its middle, guides for the lower member permitting it to slide with reference to the upper member, and a lever for restoring the lower member, a toothed sector, and a ratchet device for engaging said sector to hold the lower member in lowered position.

13. In a deflating machine for tire tubes, an expanding form comprising two oblong members, each having substantially straight legs which slide along the legs of the opposite members.

In witness whereof, I have hereunto signed my name.

HENRY P. KRAFT.